March 26, 1963  F. H. PETERSEN  3,082,681
PICKLE SYRINGE
Filed Sept. 14, 1960
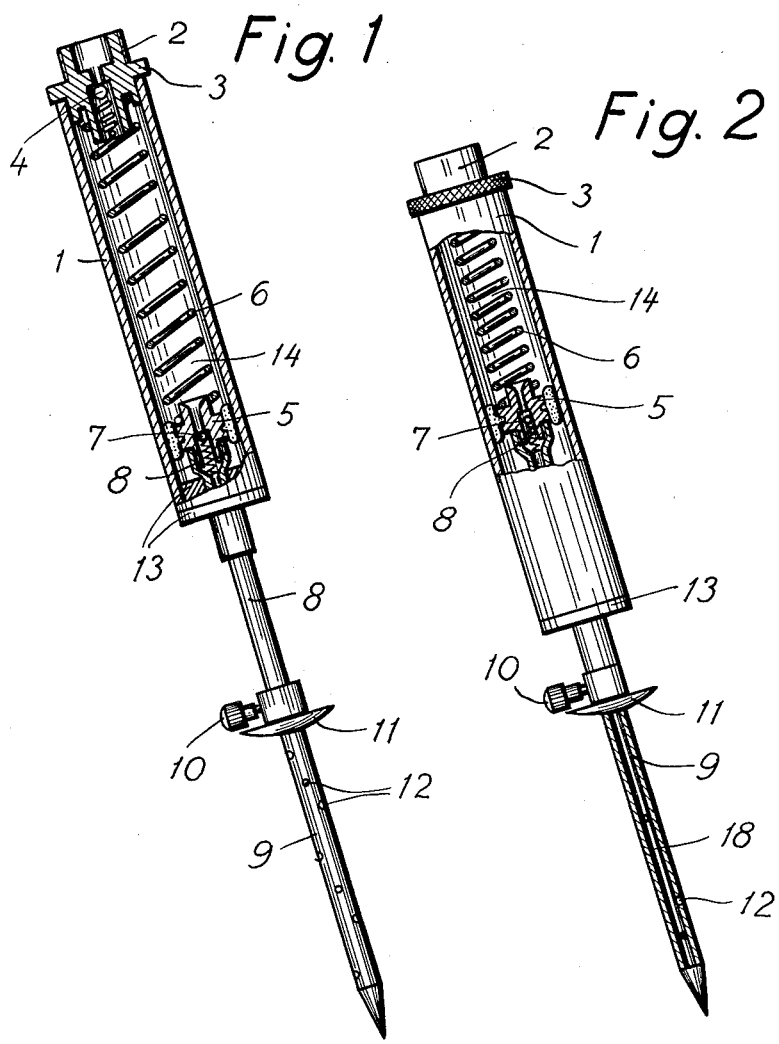
Inventor
FLEMMING HOLMGAARD PETERSEN
By Mason, Fenwick & Lawrence
Attorneys 3,082,681
PICKLE SYRINGE
Flemming Holmgaard Petersen, Svanegaarden, Nykobing Sj., Denmark
Filed Sept. 14, 1960, Ser. No. 55,933
Claims priority, application Denmark Sept. 18, 1959
3 Claims. (Cl. 99—257)

The invention relates to a pickle syringe of the kind serving to inject pickle into meat for purposes of preservation, the said syringe consisting of a piston cylinder registering at its end with a heavy, hollow needle having lateral discharge holes.

In the known syringes of this kind the needle is at first introduced into the meat, after which the piston is pushed forward by means of a handle provided on its rearwardly projecting piston rod, whereby the liquid in front of the piston is forced through the front end wall of the cylinder into the needle, hence to be distributed through the lateral holes provided in same into the meat. When the piston is withdrawn a fresh portion of pickle is sucked into the cylinder through a non-return valve provided in the front end of the cylinder.

The object of the present invention is to facilitate the operation of the pickle syringe so that the said handle is fully dispensed with.

For this purpose the inlet end of the needle is according to the invention attached to the piston of the cylinder. As a result, the needle moves with the piston in relation to the cylinder.

Both the introduction of the needle into the meat and the injection of the pickle take place in one uniform movement. As this operation proceeds and the needle encounters greater resistance the conveyance of the pickle is increased.

In accordance with the invention such part of the needle as extends outside the cylinder may be provided with a stop collar to limit the piston stroke.

In accordance with the invention there may further be provided a pressure spring behind the piston. Only when the needle has been introduced into the meat and the stop collar is brought to rest against the outer side of the meat, the conveyance of the pickle will begin, the spring having in all essentials prevented the movement of the piston so far.

When the cylinder is withdrawn, the spring will at first recover its original shape and a fresh supply of pickle is simultaneously sucked into the cylinder, and then the needle will be withdrawn from the meat too.

The syringe can be operated by one hand.

The drawing shows an embodiment of a pickle syringe in accordance with the invention.

FIGURE 1 shows the syringe, ready to be used, and partially in section.

FIGURE 2 is the same, after the needle has been introduced into the meat and the pickle injected.

From an elevated tank (not shown) pickle may flow into the cylinder 1 of the syringe through a nipple 2 provided in the rear end wall 3 in which is inserted a non-return valve 4. Between the end wall 3 and the piston 5 of the syringe is inserted a powerful helical pressure spring 6 urging the piston 5 into the position shown in FIGURE 1.

Inside the piston is provided another non-return valve 7 which communicates with the central passage 8 in a heavy needle 9 in the front part of which, that is, in front of a stop collar 11 that is provided with an adjustment screw 10, there are lateral holes 12 communicating with the passage 8. The needle is passed through another end cover 13 of the syringe, but this passage need not be liquid-tight.

When operated, the syringe with the needle 9 is passed into the meat (not shown) until the stop collar 11 is brought into contact with the surface of the meat. Up to this moment the spring 6 has prevented the piston 5 from moving inside the cylinder 1. When the cylinder 1 is subsequently passed further towards the meat surface by hand, the spring 6 will be compressed and the portion of pickle contained in the chamber 14 of the cylinder will be forced into the needle through the valve 7 and be injected through the holes 12 into the meat.

At the close of this movement the syringe is in the position indicated in FIGURE 2 and when the syringe is subsequently withdrawn, the spring 6 will at first recover its original shape by which a fresh portion of pickle is drawn through the nipple 2 into the chamber 14, and only when the needle 9 has been pressed entirely out of the cylinder 1 the needle will be drawn clear of the meat by the continued withdrawal of the cylinder.

The pickle syringe according to the invention may also be of other designs than that disclosed. Thus, the non-return valve 4 may be disposed in the rear part of the cylindrical wall, just as the spring 6 and the stop collar 11 each separately or both may be dispensed with or be substituted by other elements having a corresponding effect.

What I claim and desire to secure by Letters Patent is:

1. A syringe for injecting a preserving fluid into meat comprising, a hollow closed-end cylinder forming a piston chamber, an inlet opening in one end of the cylinder and check valve therefor openable under suction in the chamber to admit fluid through the inlet opening into the chamber, the other end of the cylinder having a needle-opening therethrough, a hollow needle having lateral discharge holes slidably mounted in the needle-opening, a piston slidable within the chamber and connected to the hollow needle, the piston having an opening therethrough communicating with the hollow needle, a check valve in the piston opening operable under pressure in the chamber to admit fluid from the chamber to the hollow needle, and a spring interposed between the piston and the end of the cylinder having the inlet opening.

2. A syringe for injecting a preserving fluid into meat as claimed in claim 1, wherein there is a stop collar on the needle outside the cylinder.

3. A syringe for injecting a preserving fluid into meat as claimed in claim 2, wherein the stop collar is adjustable along the hollow needle.

References Cited in the file of this patent
UNITED STATES PATENTS

| | | |
|---|---|---|
| 1,271,490 | Servatius | July 2, 1918 |
| 2,378,624 | Edwards | June 19, 1945 |
| 2,868,172 | Kerman | Jan. 13, 1959 |